United States Patent [19]
Wang et al.

[11] Patent Number: 6,150,494
[45] Date of Patent: *Nov. 21, 2000

[54] POLYMERS CONTAINING OPTICAL BRIGHTENER COMPOUNDS COPOLYMERIZED THEREIN AND METHODS OF MAKING AND USING THEREFOR

[75] Inventors: Richard Hsu-Shien Wang; James J. Krutak; Mahendra K. Sharma; Barbara C. Jackson, all of Kingsport, Tenn.

[73] Assignee: Eastman Chemical Company, Kingsport, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/070,516

[22] Filed: Apr. 30, 1998

[51] Int. Cl.⁷ .............................. C08G 69/44; C09D 11/00
[52] U.S. Cl. ..................... 528/289; 528/275; 528/279; 528/280; 528/281; 528/285; 528/288; 528/290; 528/292; 528/293; 528/298; 528/302; 528/308; 528/308.6; 528/332; 528/335; 528/336; 106/31.01; 106/31.04; 106/31.05; 106/31.13; 106/31.14; 106/31.15; 106/31.26; 106/31.43; 106/31.46
[58] Field of Search ..................... 528/275, 279, 528/280, 281, 285, 288, 289, 290, 292, 293, 298, 302, 308, 308.6, 332, 335, 336; 106/31.01, 31.04, 31.05, 31.13, 31.14, 31.15, 31.26, 31.43, 31.46

[56] References Cited

U.S. PATENT DOCUMENTS 2,657,194 10/1953 Butler et al. .
2,657,195 10/1953 Toland .
3,709,896 1/1973 Frischkorn et al. .
3,912,697 10/1975 Pacifici .
4,095,939 6/1978 Pacifici et al. .
4,177,347 12/1979 Meyer .
4,803,241 2/1989 Weaver et al. .
4,882,412 11/1989 Weaver et al. .
4,978,476 12/1990 Allen et al. .
5,039,782 8/1991 Langer et al. .
5,082,578 1/1992 Langer et al. .
5,292,855 3/1994 Krutak et al. .
5,336,714 8/1994 Krutak et al. .
5,423,432 6/1995 Krutak et al. .

FOREIGN PATENT DOCUMENTS 506 583 4/1971 Switzerland .

Primary Examiner—Samuel A. Acquah
Attorney, Agent, or Firm—Matthew W. Smith; Harry J. Gwinnell

[57] ABSTRACT

The invention relates to a polymer prepared from the repeat units of residues of a monomer of at least one dicarboxylic acid or ester; a monomer comprising a diol, diamine or a mixture thereof; a monomer comprising at least one sulfonate group and at least one polyester reactive group, and a monomer comprising an optical brightener agent having at least one polyester reactive group. The invention further relates to a method for preparing a polymer. The invention further relates to method of marking an article or composition with the polymer. The invention further relates to a method for detecting and separating an article contacted with the polymer. The invention further relates to an article or composition contacted with the polymer. The invention further relates to a method for enhancing the optical brightness of an article or composition, by contacting the article or composition with the polymer.

63 Claims, No Drawings

POLYMERS CONTAINING OPTICAL BRIGHTENER COMPOUNDS COPOLYMERIZED THEREIN AND METHODS OF MAKING AND USING THEREFOR

FIELD OF THE INVENTION

The present invention relates to polymers containing optical brightener compounds copolymerized therein and methods of making and using therefor.

BACKGROUND OF THE INVENTION

The use of polymers with optical brightener agents copolymerized within the polymer are known in the art. These polymers have been used to prepare articles that contain products that are sensitive to UV light.

U.S. Pat. No. 4,882,412 to Weaver et al. discloses a polyester composition useful for molding into articles. The polyester composition was copolymerized with a residue of a 7-oxy-2H-1-benzopyran-2-one compound or a 7-oxy-2H-1-benzopyran-2-imine compound, which are ultraviolet compounds. U.S. Pat. No. 4,803,241 to Weaver et al. discloses a polymer composition composed of a polyester or polycarbonate copolymerized with a styrylbenzyoxazole compound.

U.S. Pat. No. 4,095,939 to Pacific et al.; U.S. Pat. No. 2,657,194 to Butler et al.; U.S. Pat. No. 3,709,896 to Frischkom et al.; and U.S. Pat. No. 2,657,195 to Toland et al. also disclose the copolymerization of ultraviolet absorbing compounds with polyesters. None of the references described above disclose the copolymerization of a sulfonate-containing monomer with the polyester and the ultraviolet absorbing compound. Thus, these polymers are not water dispersible polymers of the present invention.

U.S. Pat. No. 4,177,347 to Meyer discloses a process for the preparation of distilbenzyl-oxadiazoles and their use for optically brightening organic materials. The distilbenzyl-oxadiazoles possess a carboxyl group and sulfonate group. Meyer, however, does not disclose the copolymerization of a polyester with an ultraviolet fluorescent agent and a sulfonate-containing monomer.

U.S. Pat. Nos. 5,082,578 and 5,039,782 to Langer et al disclose the preparation of polymeric whitening agents. The copolymers contain both a fluorescent portion and a hydrophilic portion. Hydrophilic monomers that are useful include alkylene glycols such as ethylene glycol, propylene glycol, and butylene glycol. Other hydrophilic monomers include sugars such as glucose, sucrose, sorbitol, or glycerol. Surface active agents can also be added. Langer et al does not disclose the use of a sulfonate-containing monomer for the preparation of the copolymer. In addition, the surface active agents disclosed in Langer et al. are not sulfonate-containing monomers of the present invention.

The incorporation of near-infrared fluorescent agents into polymers has also been disclosed in the art. U.S. Pat. Nos. 5,292,855; 5,336,714; and 5,423,432 to Krutak et al. disclose the preparation of water-dissipatible, sulfo-containing polyesters and polyamides with near-infrared fluorescent compounds copolymerized within the polymer. There is no disclosure or motivation in these references to use an optical brightener compound in place of or in addition to the near-infrared compound to produce the present invention.

In light of the above it would be very desirable to produce water-dispersible polymers with optical brightener compounds copolymerized within the polymer. The present invention, as described below, relates to water-dispersible polymeric compositions that are useful in the formulation of optical brightener inks, paints and film forming compositions. The water-dispersible polymeric compositions are unique in that the optical brightener compounds are not extractable, exudable, sublimable or leachable from the polymeric composition. Also, since the optical brightener compounds are bound to polymer chain by covalent bonds or incorporated into the backbone of the polymer by covalent bonds, toxicological concerns are minimized because of low potential for exposure to humans.

Another object of the present invention is to enhance the optical brightness of an article or composition. Articles or compositions contacted with a polymer containing an optical brightener compound of the present invention can offset any discoloration in the article or composition.

Another object of the present invention is to prepare articles or compositions from the polymeric compositions. In one embodiment, the inks, paints and film forming compositions prepared from the polymeric compositions of this invention are especially useful in "marking" or "tagging" various items such as security documents, bank checks and other printed or coated materials where subsequent detection or identification is desired.

In another embodiment of the present invention, the polymeric compositions possess optical brightener and near-infrared fluorescent agents either as separate polymers or copolymerized together. Therefore, articles or compositions prepared from the polymeric compositions of the present invention have an additional advantage over prior art articles or compositions in that they can be detected by exposing these articles or compositions either or both to near-infrared and ultraviolet light.

SUMMARY OF THE INVENTION

In accordance with the purpose(s) of this invention, as embodied and broadly described herein, this invention, in one aspect, relates to a polymer comprising the repeat units of residues of
  a) a monomer comprising a dicarboxylic acid or ester,
  b) a monomer comprising a diol, diamine or a mixture thereof,
  c) a monomer comprising at least one sulfonate group and at least one polyester reactive group, and
  d) a monomer comprising an optical brightener agent having at least one polyester reactive group.

The invention further relates to a method for preparing a polymer, comprising polymerizing
  a) a monomer comprising a dicarboxylic acid or ester,
  b) a monomer comprising a diol, diamine or a mixture thereof,
  c) a monomer comprising at least one sulfonate group and at least one group that can react with a hydroxyl, amino or carboxyl group, and
  d) a monomer comprising an optical brightener agent with at least one polyester reactive group,
    in the presence of a catalyst system.

The invention relates to a method for marking an article or composition, comprising applying to the article or composition the polymer comprising the repeat units of residues of
  a) a monomer comprising a dicarboxylic acid or ester,
  b) a monomer comprising a diol, diamine or a mixture thereof, c) a monomer comprising at least one sulfonate group and at least one polyester reactive group, and d) a monomer comprising an optical brightener agent having at least one polyester reactive group.

The invention further relates to a method for marking an article or composition, comprising applying to the article or composition the polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group;

d) a monomer comprising an optical brightener agent having at least one polyester reactive group; and e) a monomer comprising a near-infrared fluorophoric compound with at least one polyester reactive group.

The invention further relates to a method for marking an article or composition, comprising applying to the article or composition the first polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group, and d) a monomer comprising an optical brightener agent having at least one polyester reactive group, and a second polymer comprising the repeat units of residues of i) a monomer comprising a dicarboxylic acid or ester, ii) a monomer comprising a diol, diamine or a mixture thereof, iii) a monomer comprising at least one sulfonate group and at least one polyester reactive group, and iv) a monomer comprising a near-infrared fluorophoric compound with at least one polyester reactive group.

In another embodiment, the invention relates to a method for enhancing or improving the optical brightness of an article or composition comprising contacting the article or composition with the polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group, and d) a monomer comprising an optical brightener agent having at least one polyester reactive group.

The invention further relates to an article or composition contacted with a polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group, and d) a monomer comprising an optical brightener agent having at least one polyester reactive group.

The invention further relates to an article or composition contacted with a polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group;

d) a monomer comprising an optical brightener agent having at least one polyester reactive group; and e) a monomer comprising a near-infrared fluorophoric compound with at least one polyester reactive group.

The invention further relates to an article or composition contacted with a first polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group, and d) a monomer comprising an optical brightener agent having at least one polyester reactive group, and a second polymer comprising the repeat units of residues of i) a monomer comprising a dicarboxylic acid or ester, ii) a monomer comprising a diol, diamine or a mixture thereof, iii) a monomer comprising at least one sulfonate group and at least one polyester reactive group, and iv) a monomer comprising a near-infrared fluorophoric compound with at least one polyester reactive group.

The invention further relates to a method for detecting and separating a fluorescing article from a non-fluorescing article, comprising a) exposing the article contacted with the polymer comprising the repeat units of residues of i) a monomer comprising a dicarboxylic acid or ester, ii) a monomer comprising a diol, diamine or a mixture thereof, iii) a monomer comprising at least one sulfonate group and at least one polyester reactive group, and iv) a monomer comprising an optical brightener agent having at least one polyester reactive group with ultraviolet radiation, b) detecting the emitted blue visible light from the irradiated article via visible blue light detection means, and c) separating the fluorescing article from the non-fluorescing article.

The invention further relates to a method for detecting and separating a fluorescing article from a non-fluorescing article comprising a) exposing the article contacted with the polymer comprising the repeat units of residues of i) a monomer comprising a dicarboxylic acid or ester, ii) a monomer comprising a diol, diamine or a mixture thereof, iii) a monomer comprising at least one sulfonate group and at least one polyester reactive group;

iv) a monomer comprising an optical brightener agent having at least one polyester reactive group; and v) a monomer comprising a near-infrared fluorophoric compound with at least one polyester reactive group with ultraviolet radiation, near-infrared radiation, or both;

b) detecting the emitted blue visible light, near-infrared fluorescent light, or both from the irradiated article via visible blue, near-infrared fluorescence detection means or both, and c) separating the fluorescing article from the non-fluorescing article.

The invention further relates to a method for detecting and separating a fluorescing article from a non-fluorescing article, comprising a) exposing the article coated with the polymer comprising the repeat units of residues of
   i) a monomer comprising a dicarboxylic acid or ester,
   ii) a monomer comprising a diol, diamine or a mixture thereof,
   iii) a monomer comprising at least one sulfonate group and at least one polyester reactive group, and
   iv) a monomer comprising an optical brightener agent having at least one polyester reactive group,
   and a polymer comprising the repeat units of residues of
   v) a monomer comprising a dicarboxylic acid or ester,
   vi) a monomer comprising a diol, diamine or a mixture thereof,
   vii) a monomer comprising at least one sulfonate group and at least one polyester reactive group, and
   viii) a monomer comprising a near-infrared fluorophoric compound with at least one reactive group with ultraviolet radiation, near-infrared radiation, or both;

b) detecting the emitted blue visible light, near-infrared light, or both from the irradiated article via visible blue, near-infrared fluorescence detection means or both, and c) separating the fluorescing article from the non-fluorescing article.

The invention further relates to a method for enhancing the optical brightness of an article or composition comprising contacting the article or composition with a polymer of the present invention.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

The term "alkyl" is used to designate a straight or branched chain substituted or unsubstituted hydrocarbon radical containing from 1 to 12 carbon atoms.

With the terms "lower alkyl," "lower alkoxy," "lower alkylthio," "lower alkoxycarbonyl," "lower alkanoyl" and "lower alkanoyloxy," the alkyl portion contains from 1 to 6 carbon atoms and may be a straight or branched chain and substituted or unsubstituted.

The term "cycloalkyl" is used to represent a cyclic aliphatic hydrocarbon radical containing from 3 to 8 carbon atoms, preferably from 5 to 7 carbon atoms.

The "alkyl" and "lower alkyl" groups may be substituted with one or more groups selected from hydroxy, halogen, carboxy, cyano, $C_1$–$C_4$ alkoxy, aryl, $C_1$–$C_4$-alkylthio, arylthio, aryloxy, $C_1$–$C_4$-alkoxycarbonyl or $C_1$–$C_4$-alkanoyloxy.

The term "aryl" includes carbocyclic aromatic radicals containing from 6 to 18 carbon atoms, preferably phenyl and naphthyl, optionally substituted with one or more substituents selected from lower alkyl, lower alkoxy, halogen, lower alkylthio, N(lower alkyl)$_2$, trifluromethyl, carboxy, lower alkoxycarbonyl, hydroxy, lower alkanoylamino, lower alkylsulfonylamino, arylsulfonylamino, cycloalkylsulfonylamino, lower alkanoyloxy, cyano, phenyl, phenylthio and phenoxy.

The term "heteroaryl" is used to represent mono- or bicyclic heteroaromatic radicals containing at least one heteroatom selected from oxygen, sulfur and nitrogen or a combination of these atoms. Examples of suitable heteroaryl groups include, but are not limited to, thiazolyl, benzothiazolyl, pyrazolyl, pyrrolyl, thienyl, furyl, thiadiazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl also includes the structure shown below and isomers thereof,

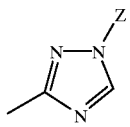

wherein Z is hydrogen or selected from lower alkyl and lower alkyl substituted with one or two groups selected from hydroxy, halogen, carboxy, lower alkoxy, aryl, cyano, cycloalkyl, lower alkanoyloxy or lower alkoxycarbonyl.

The terms "alkenyl" and "alkynyl" are used to denote a substituted or unsubstituted hydrocarbon moiety having from 3 to 8 carbon atoms and containing at least one carbon-carbon double bond and one carbon-carbon triple bond, respectively.

The term halogen is used to include bromine, chlorine, fluorine and iodine.

The term "substituted alkyl" is used to denote a straight or branched chain hydrocarbon radical containing from 1 to 12 carbon atoms and substituted with at least one group, preferably selected from hydroxy, halogen, carboxy, cyano, $C_1$–$C_4$ alkoxy, aryl, $C_1$–$C_4$ alkylthio, arylthio, aryloxy, $C_1$–$C_4$ alkoxycarbonyl, $C_1$–$C_4$ alkanoyloxy, or a combination thereof The term "substituted carbamoyl" is used to denote a radical having the formula —C(O)NRR', wherein R and R' are selected from unsubstituted or substituted alkyl, alkenyl, alkynyl, cycloalkyl, aryl, or heteroaryl.

The term "substituted sulfamoyl" is used to denote a radical having the formula —SO$_2$NRR', wherein R and R' are as defined above.

The term "alkylene" refers to a divalent $C_1$–$C_{12}$ aliphatic hydrocarbon moiety, either straight or branched-chain, and either unsubstituted or substituted with one or more groups selected from lower alkoxy, halogen, aryl, or aryloxy.

The term "acyl" refers to a group of the formula R"C(O)O—, wherein R" is preferably a $C_1$–$C_{10}$ alkyl moiety. The term "alkyl sulfonyl" refers to a group of the formula R"$SO_2$—, wherein R" is as defined for acyl.

The term "sulfonate group" is defined as —$SO_3Y$, wherein Y is hydrogen, alkyl or aryl as defined above, or a metal ion.

The phrase "polyester reactive group" is defined as any functional group capable of reacting with an alcohol, an arnine, a carboxylic acid, a carboxylic anhydride, a carboxylic halide, a carbamide, or a carboxylic ester.

The phrase "near-infrared" is defined as the region of the electromagnetic spectrum with wavelengths of from 700 to 1100 nm. The term "ultraviolet" is defined as the region of the electromagnetic spectrum having a wavelength of from 150 to 400 nm. The term "visible" is defined as the region of the electromagnetic spectrum with a wavelength of from 400 to 700 nm. The blue visible region of the electromagnetic spectrum is defined as the region having a wavelength of from 400 to 500 nm.

The phrase "optical brightener agent" is a compound that can absorb light in the ultraviolet range. Once the optical brightener compound has been exposed to ultraviolet light, the compound emits blue visible light.

A "near infrared fluorophoric compound" is a compound that absorbs and emits light in the near infrared region.

In accordance with the purpose(s) of this invention, as embodied and broadly described herein, this invention, in one aspect, relates to a polymer comprising the repeat units of residues of a) a monomer comprising a dicarboxylic acid or ester,
b) a monomer comprising a diol, diamine or a mixture thereof,
c) a monomer comprising at least one sulfonate group and at least one polyester reactive group, and
d) a monomer comprising an optical brightener agent having at least one polyester reactive group.

The dicarboxylic acid monomer comprises an aliphatic diacid, a cycloaliphatic diacid, an aromatic diacid or a mixture thereof. Examples of carboxylic acids useful for preparing the polymer include, but are not limited to, succinic acid, glutaric acid, adipic acid, azelaic acid, sebacic acid, 1,4-cyclohexanedicarboxylic acid, phthalic acid, terephthalic acid, isophthalic acid, or 2,6-naphthalenedicarboxylic acid. In one embodiment, the dicarboxylic acid comprises 1,4-cyclohexanedicarboxylic acid or isophthalic acid.

It should be understood the corresponding acid anhydrides, esters, and acid chlorides of the dicarboxylic acids listed above can be used as well. In one embodiment, a dicarboxylic ester can be used to prepare the polyester. In a preferred embodiment, the dicarboxylic ester comprises the dimethyl ester of 1,4-cyclohexanedicarboxylic acid, the dimethyl ester of isophthalic acid, or a mixture thereof.

The amount of components a–d used to prepare the polymers of the present invention can vary. Unless stated otherwise, the sum of components a–d is equal to 100 parts.

In one embodiment, the amount of dicarboxylic acid or ester is from 35 to 65 parts by weight of the total polymer, wherein the sum of components a–d is equal to 100 parts.

When a diol is used as a monomer to prepare the polymer, the diol comprises an aliphatic glycol, an aralkyl glycol, a cycloaliphatic glycol or a mixture thereof. Examples of diols useful in the present invention include, but are not limited to, ethylene glycol; diethylene glycol; propylene glycol; 1,3-propanediol; 2,4-dimethyl-2-ethylhexane-1,3-diol; 2,2-dimethyl-1,3-propanediol; 1,3-butanediol; 1,4-butanediol; 1,5-pentanediol; 1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; or 2-methyl-1,3-propanediol. In one embodiment, the diol is ethylene glycol, 1,4-cyclohexanedimethanol or diethylene glycol.

In one embodiment, the amount of diol used is from 25 to 50 parts by weight of the total polymer, wherein the sum of components a–d is equal to 100 parts.

A diamine can also be used alone or in combination with the diol. In one embodiment, the diamine comprises an aliphatic diamine, a cycloaliphatic diamine, an aralkyl diamine or a mixture thereof. Examples of diamines useful in the present invention include, but are not limited to, 1,6-hexamethylenediamine; 1,6-cyclohexanedimethylamine; 1,3-diaminomethylbenzene; 2,2-dimethyl-1,3-propanediamine; or $H_2NCH_2CH_2(OCH_2CH_2)_vOCH_2CH_2NH_2$, wherein v is an integer of from 0 to 20. In another embodiment, the amount of diamine is from 0 to 50 parts by weight of the total polymer, wherein the sum of components a–d is equal to 100 parts.

The sulfonate-containing monomer contains at least one polyester reactive group. In one embodiment, the sulfonate-containing monomer is a dicarboxylic acid or an ester thereof containing a sulfonate group. In another embodiment, the sulfonate-containing monomer is a glycol containing a sulfonate group. In another embodiment, the sulfonate-containing monomer is a hydroxy acid containing a sulfonate group.

In another embodiment, the sulfonate group is attached to an aromatic group such as benzene, naphthalene, diphenyl, oxydiphenyl, sulfonyldiphenyl or methylenediphenyl nucleus. In one embodiment, the sulfonate group is a metal sulfonate. In another embodiment, the metal ion of the metal sulfonate comprises an alkali metal, alkaline earth metal, a transition metal, a lanthanide or an actinide, preferably sodium, lithium or potassium. It is also possible to exchange the metal ion by ion-exchange and alter the characteristics of the polymer. In one embodiment, when a monovalent alkali metal ion is used, the resulting polyesters are less readily dissipated by cold water and more readily dissipated by hot water.

In another embodiment, the sulfonate-containing monomer comprises sulfophthalic acid, sulfoterephthalic acid, sulfoisophthalic acid, 4-sulfonaphthalene-2,7-dicarboxylic acid, 5-sulfoisophthalic acid or the salt or ester thereof. In a preferred embodiment, the sulfonate-containing monomer is 5-sodiosulfoisophthalic acid. In an even more preferred embodiment, the sulfonate-containing monomer is 5-sodiosulfoisophthalic acid and the diol component is ethylene glycol or 1,4-cyclohexanedimethanol with diethylene glycol.

The amount of sulfonate-containing monomer varies depending upon the amount of glycol selected. In one embodiment, the water dispersibility of the polyester is related to the weight percent of poly(ethylene glycol) and mole percent of the sulfonate-containing monomer. Therefore, if the content of either is relatively low, the other should be relatively high to maintain adequate dispersibility. In one embodiment, the amount of sulfonate-containing monomer is from 5 to 65, preferably from 8 to 30 parts by weight of the total polymer, wherein the sum of components a–d is equal to 100 parts.

The applicants have unexpectedly discovered that any optical brightener agent possessing at least one polyester reactive group can be copolymerized with the dicarboxylic acid component, diol and/or diamine component, and the sulfonate-containing monomer to produce a polymer of the present invention. In one embodiment, when the concentration of the optical brightener agent is less than or equal to 2000 ppm, the optical brightener agent can have one, preferably two polyester reactive groups. In another embodiment, when the concentration of the optical brightener agent is greater than 2000 ppm, the optical brightener agent preferably possesses at least two polyester reactive groups.

In another embodiment, all of the optical brightener agents are conjugated. In another embodiment, when there are styryl and stilbenyl groups present in the optical brightener agent, the stereochemistry about the carbon-carbon double bond can be cis or trans, preferably trans.

In one embodiment, the optical brightener agent has the structure I

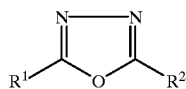

I wherein $R^1$ and $R^2$ are, independently, naphthyl, diphenyl, aryl, alkenyl, alkynyl or heteroaryl wherein said moieties $R^1$ and $R^2$ are substituted or unsubstituted. In another embodiment, $R^1$ and $R^2$ are independently both aryl groups and the aryl group has the structure

wherein, each $R^3$ independently comprises an alkyl group, a cycloalkyl group, an aralkyl group, an alkenyl group, an alkynyl group, an alkoxy group, an alkenyloxy group, an alkynyloxy group, a substituted or unsubstituted amino group, a halogen, or a carboxyl group, wherein the carboxyl group comprises a carboxylic acid, an ester, an anhydride, a carbonyl halide, or a carbamide, and n is an integer of from 1 to 5. In another embodiment, $R^3$ has the structure

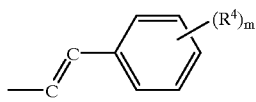

wherein each $R^4$ independently comprises a polyester reactive group and m is an integer of from 1 to 3. In another embodiment, $R^4$ comprises a carboxyl group, wherein the carboxyl group comprises a carboxylic acid, an ester, an anhydride, a carbonyl halide, or a carbamide.

In a preferred embodiment, $R^1$ and $R^2$ have the structure

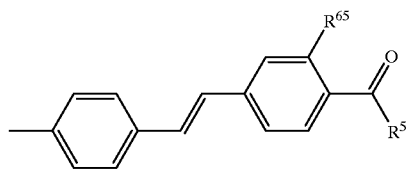

XVIII wherein $R^5$ comprises a hydroxyl group, an alkoxy group, an alkoxy hydroxy group, an alkenyloxy group, an alkyyloxy group, an amide, a halide, a carboxyl group or a substituted or unsubstituted amino group, and $R^{65}$ comprises hydrogen, a halide, an alkyl group, or an alkoxy group. In one embodiment, $R^1$ and $R^2$ have the structure XVIII, wherein $R^5$ is hydroxy, methoxy, ethoxy, butoxy, 2-ethyl-hexyloxy, $NHCH_2CH_2NH_2$, $OCH_2CH_2OH$, fluoro, chloro, bromo, or iodo and $R^{65}$ is hydrogen. In another embodiment, $R^1$ and $R^2$ have the structure XVIII, wherein $R^5$ is methoxy and $R^{65}$ is chloride, fluoride, methyl or methoxy.

The line attached to the aryl ring of structure XVIII denotes a chemical bond and not an additional carbon atom. Thus, the aryl ring of structure XVIII is chemically bonded to the oxadiazole ring of structure I at the para position. Throughout the application, when the line does not explicitly show a carbon atom, then it is meant to be a bond attachment and not an additional carbon atom.

In a another embodiment, $R^1$ and $R^2$ are independently an alkenyl group and each alkenyl group independently has the structure wherein $R^6$ is a polyester reactive group, and p is an integer of from 1 to 3. In one embodiment, $R^6$ comprises a carboxyl group, wherein the carboxyl group comprises a carboxylic acid, an ester, an anhydride, a carbonyl halide, or a carbamide. In a preferred embodiment, $R^1$ and $R^2$ independently have the structure

XIX wherein $R^7$ comprises a hydroxyl group, an alkoxy group, an alkoxy hydroxy group, an alkenyloxy group, an alkyyloxy group, an amide, a halide, a carboxyl group or a substituted or unsubstituted amino group, and $R^{66}$ comprises hydrogen, a halide, an alkyl group, or an alkoxy group. In one embodiment, $R^1$ and $R^2$ have the structure XIX, wherein $R^7$ is hydroxy, methoxy, ethoxy, butoxy, 2-ethyl-hexyloxy, $NHCH_2CH_2NH_2$, $OCH_2CH_2OH$, fluoro, chloro, bromo, or iodo and $R^{66}$ is hydrogen. In another embodiment, $R^1$ and $R^2$ have the structure XIX, wherein $R^7$ is methoxy and $R^{66}$ is chloride, fluoride, methyl or methoxy.

Compounds having the structure I can be prepared using the methodology disclosed in U.S. Pat. No. 4,177,347 to Meyer and German Patent No. 4858/66 to Siegrist et al., which are hereby incorporated by this reference. Examples of compounds having the structure I that are useful in the present invention are disclosed in German Patent No. 4858/66 to Siegrist et al., which is herein incorporated by this reference for those compounds.

In another embodiment, the optical brightener agent has the structure II

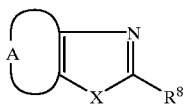
II wherein, A is the residue of a fused ring; $R^8$ is naphthyl, diphenyl, aryl, alkenyl, alkynyl or heteroaryl, wherein said moiety $R^8$ is substituted or unsubstituted, and X is —O—, —S—, or —N($R^9$), wherein $R^9$ is hydrogen, alkenyl or an unsubstituted or substituted alkyl, cycloalky or aryl, wherein at least one polyester reactive group is present in the optical brightener agent.

In another embodiment, $R^8$ has the structure

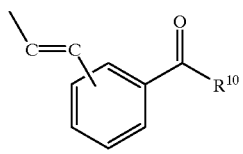

wherein $R^{10}$ is halogen or W—$R^{27}$, wherein W is —O— or —N($R^{28}$), wherein $R^{27}$ and $R^{28}$ are independently hydrogen, alkenyl or an unsubstituted or substituted alkyl, cycloalkyl or aryl.

Compounds having the structure II can be prepared using the methodology disclosed in U.S. Pat. No. 3,274,184, which is hereby incorporated by this reference. Examples of compounds having the structure II that are usefull in the present invention are disclosed in U.S. Pat. No. 4,803,241 to Weaver et al.; U.S. Pat. No. 4,978,476 to Allen et al.; U.S. Pat. No. 3,912,697 to Pacific; and U.S. Pat. No. 3,709,896 to Frischkom et al., which are hereby incorporated by this reference.

In another embodiment, the optical brightener agent has the structure

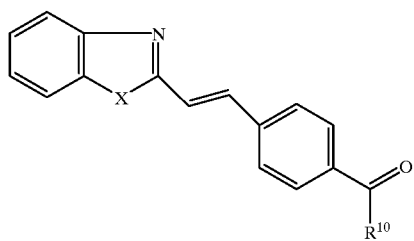

wherein, X is —O—, —S—, or —NH—, and $R^{10}$ is hydroxy, alkoxy, hydroxylalkylarnine or di(hydroxyalkyl)amine.

In another embodiment, the optical brightener agent has the structure

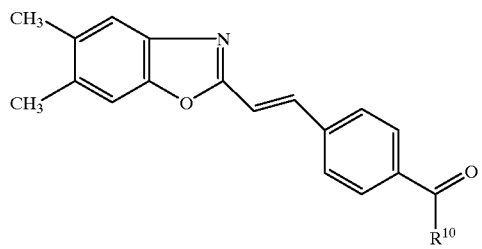

wherein $R^{10}$ is lower alkoxy, hydroxy or chloro.

In another embodiment, the optical brightener agent has the structure

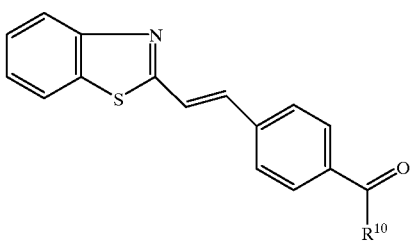

wherein $R^{10}$ is lower alkoxy, hydroxy or chloro.

In another embodiment, the optical brightener agent has the structure

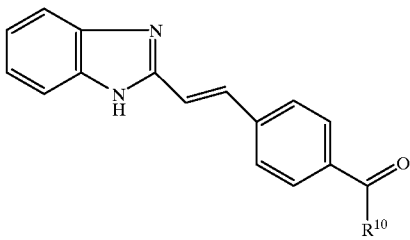

wherein $R^{10}$ is lower alkoxy, hydroxy or chloro.

In another embodiment, the optical brightener agent has the structure

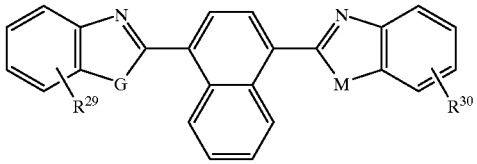

wherein, $R^{29}$ is a polyester reactive group; $R^{30}$ is naphthyl, diphenyl, aryl, alkenyl, alkyyl, heteroaryl or a polyester reactive group, wherein said moiety $R^{30}$ is substituted or unsubstituted; and G and M are independently —O—, —S—, or $NR^{31}$, wherein $R^{31}$ is branched or straight chain $C_1$–$C_{12}$.

In another embodiment, the optical brightener agent has the structure

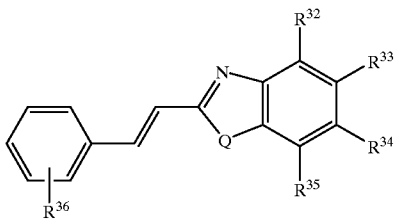

wherein, $R^{32}$, $R^{33}$, $R^{34}$ and $R^{35}$ are independently hydrogen, substituted or unsubstituted lower alkyl, cycloalkyl, aryl, lower alkylaryl, alkoxy or a fused ring; $R^{36}$ is a polyester reactive group; and Q is —O—, —S—, or —NR$^{37}$, wherein $R^{37}$ is branched or straight chain $C_1$–$C_{12}$.

In another embodiment, the optical brightener agent has the structure

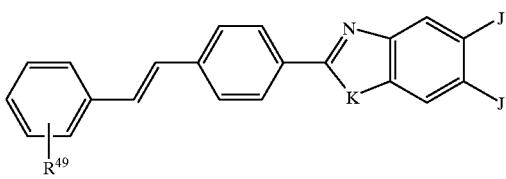

wherein, K is —S—, —O—, or NR$^{50}$, wherein $R^{50}$ is $C_1$–$C_4$ branched or straight chain alkyl; $R^{49}$ is a polyester reactive group, and each J is independently hydrogen, a cyano group, a nitro group, or a trifluoromethyl group.

In another embodiment, the optical brightener agent has the structure

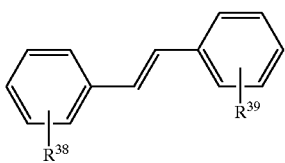

wherein, $R^{38}$ is a polyester reactive group, and $R^{39}$ is naphthyl, diphenyl, aryl, alkenyl, alkynyl, cycloalkylene, heteroaryl or a polyester reactive group wherein said moiety $R^{39}$ is substituted or unsubstituted.

In another embodiment, the optical brightener agent is a benzopyran having the structure IV

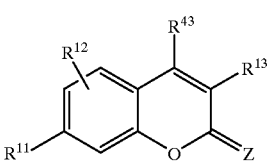

wherein, $R^{11}$ is hydroxy, —OR$^{14}$ or —OC(O)R$^{15}$; $R^{12}$ is hydrogen, alkyl, —OR$^{40}$ or halogen; $R^{13}$ is cyano, —C(O)R$^{41}$, —CO$_2$R$^{41}$, carbamoyl, —C(O)N(R$^{42}$)(R$^{41}$), —SO$_2$R$^{42}$ or a carbocyclic or heterocyclic aryl group; $R^{43}$ is hydrogen, aryl, alkyl or —CH$_2$CO$_2$R$^{44}$; $R^{14}$, $R^{40}$ and $R^{42}$ are independently alkenyl, alkyl, cycloalkyl or aryl; $R^{15}$, $R^{41}$ and $R^{44}$ are independently hydrogen, alkyl, cycloalkyl or aryl; $R^{44}$ is alkyl, cycloalkyl or aryl radical; and Z is oxo or imino, wherein the benzopyran has at least one polyester reactive group.

In one embodiment, the optical brightener agent has the structure

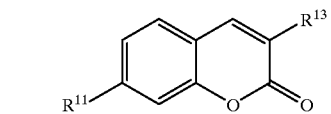

wherein, $R^{11}$ is hydroxy, hydroxyalkoxy, alkanoyloxyalkoxy, alkoxycarbonylalkoxy or alkoxycarbonylphenylalkoxy, and $R^{13}$ is alkoxycarbonyl, arylsulfonyl, cyano, 2-benzoxazolyl, 2-benzothiazolyl or 2-benzimidazolyl, wherein each alkoxy group of $R^{11}$ and $R^{13}$ independently contains from one to six carbon atoms and each aryl group independently is a phenyl group or phenyl substituted with a $C_1$–$C_4$ alkyl group or halogen.

In one embodiment, the optical brightener agent has the structure

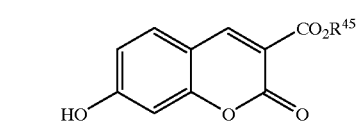

wherein, $R^{45}$ is alkyl of from one to six carbon atoms.

In one embodiment, the optical brightener agent has the structure

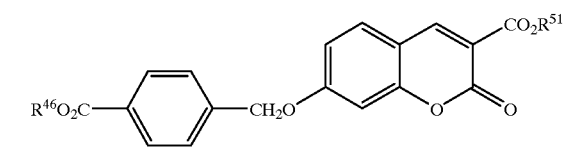

wherein $R^{51}$ and $R^{46}$ are independently alkyl of from one to six carbon atoms.

In one embodiment, the optical brightener agent has the structure

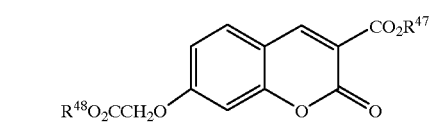

wherein $R^{47}$ and $R^{48}$ are independently an alkyl group of from one to six carbon atoms.

In one embodiment, the optical brightener agent has the structure

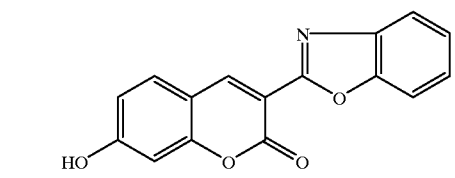

The benzopyran compounds having the structure IV can be prepared according to published procedures or variations thereof which are readily apparent to those skilled in the art. References pertaining to the preparation of compounds having the structure IV include *The Chemistry of Coumarins* by S. Sethna and N. M. Shan, *Chem. Rev.*, 36, 1; *Coumarins,*

Heterocyclic Compounds, ed. R. C. Elderfield, Vol. 2, p. 173; Coumarin and Its derivatives, Chemistry of Carbon Compounds, C. H. Rodd, Vol. IVB, p. 869; and U.S. Pat. Nos. 4,055,568; 4,018,796; 3,933,847; 3,910,912; 3,801,602; 3,704,302; and 3,533,730, which are hereby incorporated by this reference. Examples of compounds having the structure IV that are useful in the present invention are disclosed in U.S. Pat. No. 4,882,412 to Weaver et al., which are hereby incorporated by this reference.

The amount of optical brightener agent used can vary depending upon the intended function of the ultraviolet-absorbing residue and/or the end use for which the polyester composition is intended. In one embodiment, the amount of the optical brightener agent is from 0.00001 to 30 parts by weight of the total polymer.

The Applicants have unexpectedly discovered that a monomer of a near-infrared fluorophoric compound with at least one polyester reactive group can be copolymerized with components (a)–(d) to produce a polymer. In one embodiment, the near-infrared fluorophoric compound has two polyester reactive groups.

Examples of near-infrared compounds useful in the practice of this invention are disclosed in but not limited to GB 1,537,375; U.S. Pat. Nos. 4,606,859 and 4,904,567; U.K. Pat. Appl. GB 2,168,372; JACS, 1984, 106, pp 7404–7410; Jap. Pat. 61,215,663 (CA Vol. 114: 196445p); and Jap. Pat. 90,187,391 (CA Vol. 114: 196418g), which are hereby incorporated by this reference. These references, however, use the near-infrared compounds for optical recording devices, liquid crystal displays, electrochemical chemiluminescence and as colorants. U.S. Pat. No. 5,292855 discloses near-infrared agents and polymers containing near-infrared agents that are useful in the present invention.

In a preferred embodiment, near-infrared fluorescent compounds useful in the present invention are disclosed in International Patent Application No. WO 93/09172A entitled "Methods for Tagging Thermoplastic Materials With Near-Infrared Fluorphores," which is hereby incorporated by this reference. In one embodiment, the near-infrared fluorophoric compound comprises a phthalocyanine, a naphthalocyanine, a squaraine, or a mixture thereof. In another embodiment, the near-infrared flourophoric compound comprises a phthalocyanine, a 2,3-naphthalocyanine or a squaraine.

In one embodiment, the near-infrared fluorophoric is a compound having the structure V, VI or VII:

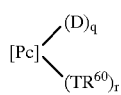

V

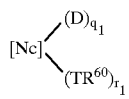

VI

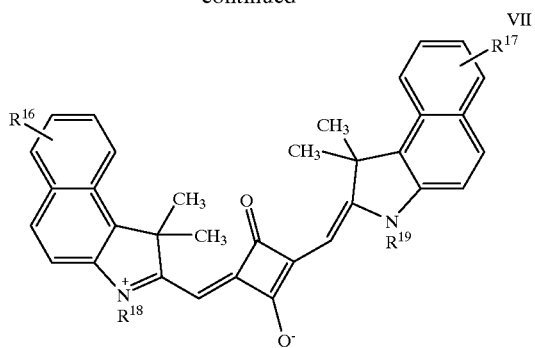

VII wherein Pc represents a phthalocyanine moiety having the structure VIII and Nc represents a 2,3-naphthalocyanine moiety having the structure IX,

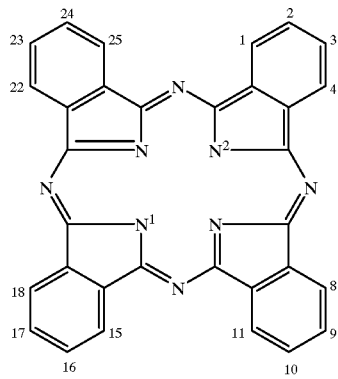

VIII

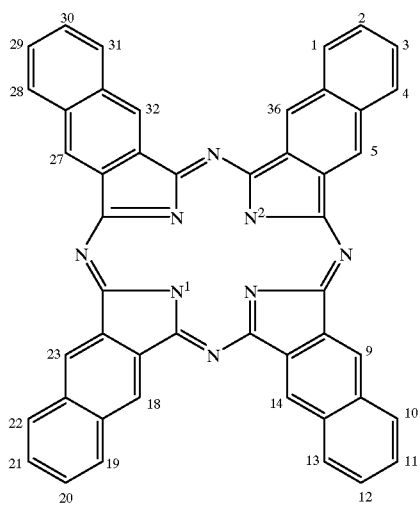

IX wherein $N^1$ and $N^2$ can independently be bonded to hydrogen or to various metals comprising halometals, organometallic groups, and oxymetals comprising AlCl, AlBr, AlF, AlOH, AlOR$^{20}$, AlSR$^{20}$, Ca, Ge, Ga, InCl, Mg, SiCl$_2$, SiF$_2$, SnCl$_2$, Sn(OR$^{21}$)$_2$, Si(OR$^{21}$)$_2$, Sn(SR$^{21}$)$_2$, Si(SR$^{21}$)$_2$, Sn, or Zn, wherein R$^{20}$ and R$^{21}$ are selected from hydrogen, alkyl, aryl, lower alkanoyl, trifluoroacetyl or groups of the formula

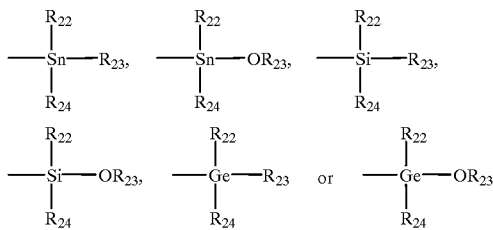

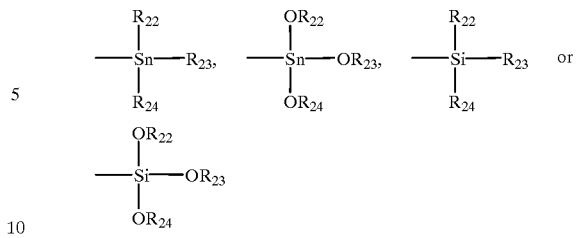

$R^{22}$, $R^{23}$ and $R^{24}$ are independently selected from alkyl, phenyl or phenyl substituted with lower alkyl, lower alkoxy or halogen; T is selected from oxygen, sulfur, selenium, tellurium or a group of the formula —$NR^{25}$, wherein $R^{25}$ is hydrogen, cycloalkyl, alkyl, acyl, alkylsulfonyl, or aryl or $R^{25}$ and $R^{60}$ taken together form an aliphatic or aromatic ring with the nitrogen atom to which they are attached; D is selected from alkyl, aryl, halogen or hydrogen; $R^{60}$ is selected from unsubstituted or substituted alkyl, alkenyl, alkynyl, $C_3$–$C_8$ cycloalkyl, aryl, heteroaryl,

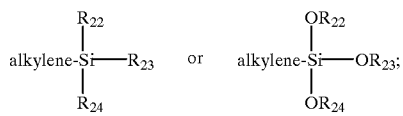

$(TR^{60})_r$ is alkylsulfonylamino, arylsulfonylamino, or a group selected from the formula —$C(C_2H_4O)_eR^{26}$,

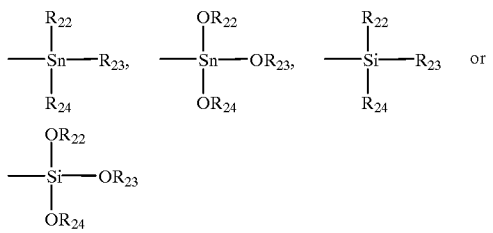

wherein $R^{26}$ is hydrogen or $R^{60}$ as defined above; e is an integer of from 1–4; or two $(TR^{60})_r$ groups can be taken together to form divalent substituents of the formula

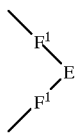

wherein each $F^1$ is independently —O—, —S—, or —N—$R^{25}$ and E comprises an alkyl group comprising ethylene, propylene or trimethylene, wherein the alkyl group is substituted with $C_1$–$C_4$ alkyl, $C_1$–$C_4$ alkoxy, aryl, cycloalkyl; 1,2-phenylene and 1,2-phenylene containing 1–3 substituents selected from $C_1$–$C_4$ alkyl, $C_1$–$C_4$ alkoxy or halogen; $R^{16}$ and $R^{17}$ are independently selected from hydrogen, lower alkyl, lower alkoxy, halogen, aryloxy, lower alkylthio, arylthio, lower alkylsulfonyl; arylsulfonyl; lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy, $R^{18}$ and $R^{19}$ are independently hydrogen, lower alkyl, alkenyl or aryl; q is an integer from 0 to 12 and r is an integer from 4 to 16 provided that the sum of q and r is 16 and at least one polyester reactive group is present, and $q_1$ is an integer from 0 to 24 and $r_1$ is an integer from 0 to 16, provided that the sum of $q_1$ and $r_1$ is 24 and at least one polyester reactive group is present.

In a preferred embodiment of this aspect of the present invention r is from 4 to 12; $r_1$ is from 0 to 8, provided that in the definitions of the substituents $(D)q$, $(D)q_1$ and $(TR^{60})_r$ are not present when q, $q_1$ and $r_1$ are zero, respectively. Substituents $(TR^{60})r$ and $(D)q$ are present in compounds having the structure VIII on the peripheral carbon atoms (positions 1–4, 8–11, 15–18, and 22–25). Substituents $(TR^{60})r_1$ and $(D)q_1$ are present on the peripheral carbon atoms of IX (positions 1–5, 9–14, 18–23, 27–32 and 36).

In another embodiment, the near-infrared fluorophoric compound is a squaraine compound having the structure VII, wherein $R^{16}$ and $R^{17}$ are independently carboxy or lower alkoxycarbonyl.

In another embodiment, the near-infrared fluorophoric compound is a 2,3-naphthalocyanine compound having the structure VI, wherein D is hydrogen, $q_1$ is 24, and $r_1$ is 0.

In another embodiment, the near-infrared fluorophoric compound is a 2,3-naphthalocyanine compound having the structure VI, wherein the naphthalocyanine moiety is bonded to $SiCl_2$, $Si(OH)_2$, or $Si(OR^{21})_2$.

In another embodiment, the near-infrared fluorophoric compound is a phthalo-cyanine compound having the structure V, wherein C is oxygen, R is aryl, D is hydrogen, r is 4, and q is 12; and wherein the phthalocyanine moiety is bonded to AlCl, AlOH, $AlOC(O)CF_3$, $AlOR^{20}$, $SiCl_2$, $Si(OH)_2$, $Si(OR^{21})_2$, GaCl, GaOH, $GaOC(O)CF_3$, $GaOR^{20}$, InCl, InOH, $InOCOCF_3$, $InOR^{20}$, magnesium, zinc, or hydrogen.

The amount of near-infrared fluorophoric compound used can vary depending upon the enduse of the resulting polymer. In one embodiment, the amount of near-infrared fluorophoric compound used is from 0.0001 to 10 parts by weight of the total polymer.

In one embodiment, the polymer comprises the repeat units of the residues of dimethyl isophthalate, dimethyl 5-sodiosulfoisophthalate, diethylene glycol, 1,4-cyclohexanedimethanol, and 2,5-bis-(4'-carbomethoxystilbenyl)-1,3,4-oxadiazole. In another embodiment, the water dispersible polymer comprises the repeat units of the residues of dimethyl isophthalate, dimethyl 5-sodiosulfoisophthalate, diethylene glycol, 1,4-cyclohexanedimethanol, and 2,5-bis-(4'-carbomethoxystyryl-phenyl)-1,2,3-oxadiazole.

In one embodiment of the present invention, at least 20% of the groups linking the monomeric units are ester linkages. In another embodiment, the polymer has an intrinsic viscosity of from 0.15 to 0.45 dL/g, preferably from 0.25 to 0.35 dL/g as determined by the ASTM method D2857.70.

In one embodiment, the polymers of the present invention are water dispersible. The term "water dispersible" is defined as the activity of a water or aqueous solution on the polymers of the present invention. The term is specifically intended to cover those situations when the solvent dissolves and/or disperses the polymer of the present invention. The polymers of the present invention can preferably, form electrostatically-stabilized colloids when mixed with an aqueous media. In one embodiment, the liquid media is water. In another embodiment, the water-dispersible polymer is from 1 to 35 parts by weight and the water is from 99 to 65 parts by weight of the total composition.

In another embodiment, the polymers of the present invention are dispersible or soluble in an organic solvent. Examples of organic solvents include, but are not limited to, methylene chloride, methyl ethyl ketone, or ethanol.

The colloid particle size varies with the polymer composition but has been shown by light diffraction studies, atomic force microscopy, and transmission electron microscopy (on fresh films) to be mostly of from 200 to 800 Å in diameter. The aqueous colloid dispersions exhibit a minimum precipitation of solid material with time, in the temperature range of from 0.1 to 99.9° C. because the relationship between the particle densities and viscosities (very similar to those of water when concentrations are less than 30 weight percent) are such that thermal energy expressed as Brownian motion is sufficient to keep the particles suspended in water. The polymers of the present invention permit the formation of a stable aqueous solution, which is another advantage of the present invention.

The invention further relates to a method for preparing a polymer, comprising polymerizing
  a) a monomer comprising a dicarboxylic acid or ester,
  b) a monomer comprising a diol, diamine or a mixture thereof,
  c) a monomer comprising at least one sulfonate group and at least one group that can react with a hydroxyl, amino or carboxyl group, and
  d) a monomer comprising an optical brightener agent with at least one polyester reactive group,
  in the presence of a catalyst system.

The polymers can be prepared by techniques known in the art for the preparation of polyesters and polyamides. In one embodiment, the catalyst system comprises a titanium compound, an antimony compound, a zinc compound, a manganese compound, a cobalt compound, an alkali metal hydroxide, or a mixture thereof. In another embodiment, the catalyst system comprises $Sb_2O_3$, $Zn(OAc)_2$, $Mn(OAc)_2$, or $Co(OAc)_2$. In another embodiment, the catalyst system is from 0.001 to 0.010 parts by weight of the total composition.

Components (a)–(d) are admixed in any order and heated in the presence of the catalyst system in order to induce polymerization. In one embodiment, the polymerization of components (a)–(d) occurs at from 200 to 280° C., preferably from 230 to 260° C.

In another embodiment, the near-infrared fluorophoric compound can be added with components (a)–(d) and the catalyst system prior to heating to produce a polymer containing a near-infrared and optical brightener agent. As described above, the near-infrared fluorophoric compound has at least one polyester reactive group.

In another embodiment, a polymer containing an optical brightener agent can be combined with a polymer containing a near-infrared agent. In one embodiment, the polymers can be combined together in a dispersion or solution. In another embodiment, the polymers can be combined in the solid state by melt blending.

As described above, the polymer can be dispersed in a liquid media. In one embodiment, the liquid media is water, acetone, methylene chloride, or methyl ethyl ketone, preferably water. In another embodiment, the polymer is from 1 to 35 parts by weight and the liquid media is from 99 to 65 parts by weight. After the polymer is added to the liquid media, the solution is agitated and heated. In one embodiment, when water is the liquid media, the solution is preferably heated from 90 to 98° C. In another embodiment, when acetone or methyl ethyl ketone is the liquid media, the solution is preferably heated from 40 to 50° C. In another embodiment, when methylene chloride is the liquid media, the solution is preferably heated of from 25 to 30° C.

The invention further relates to a method for marking an article or composition, comprising applying to the article or composition the polymer comprising the repeat units of residues of
  a) a monomer comprising a dicarboxylic acid or ester,
  b) a monomer comprising a diol, diamine or a mixture thereof,
  c) a monomer comprising at least one sulfonate group and at least one polyester reactive group, and
  d) a monomer comprising an optical brightener agent having at least one polyester reactive group.

The invention further relates to a method for marking an article or composition, comprising applying to the article or composition the polymer comprising the repeat units of residues of
  a) a monomer comprising a dicarboxylic acid or ester,
  b) a monomer comprising a diol, diamine or a mixture thereof,
  c) a monomer comprising at least one sulfonate group and at least one polyester reactive group;
  d) a monomer comprising an optical brightener agent having at least one polyester reactive group; and
  e) a monomer comprising a near-infrared fluorophoric compound with at least one polyester reactive group.

The invention further relates to a method for marking an article or composition, comprising applying to the article or composition the first polymer comprising the repeat units of residues of
  a) a monomer comprising a dicarboxylic acid or ester,
  b) a monomer comprising a diol, diamine or a mixture thereof,
  c) a monomer comprising at least one sulfonate group and at least one polyester reactive group, and
  d) a monomer comprising an optical brightener agent having at least one polyester reactive group,
  and a second polymer comprising the repeat units of residues of
  i) a monomer comprising a dicarboxylic acid or ester,
  ii) a monomer comprising a diol, diamine or a mixture thereof,
  iii) a monomer comprising at least one sulfonate group and at least one polyester reactive group, and
  iv) a monomer comprising a near-infrared fluorophoric compound with at least one polyester reactive group.

The term "marking" is defined as a method for identifying an article or composition that has been contacted with the polymers of the present invention.

In one embodiment, once the dispersion of the polymer has been prepared, it can be applied to an article or composition in a number of ways known in the art. In one embodiment, the polymer dispersion is applied to the article by conventional printing, digital printing (i.e. ink jet, thermal transfer, electrophotographic, dielectric), coating, spray-coating, dip coating, or painting. Conventional printing includes, but is not limited to, offset lithographic printing, flexographic printing, screen printing, or gravure printing. In another embodiment, the polymer can be incorporated within and throughout the article or composition. The water dispersible-polymer can be melt blended with other polymers and extruded to produce films, fibers, and plastics.

In another embodiment, the polymer can be applied to the surface of an article to form a film. When the film dries, it produces blue fluorescent light when exposed to ultraviolet radiation.

Any radiation or light source that produces ultraviolet radiation can be used to expose an article or composition contacted with a polymer of the present invention. The emitted light is detected by a blue visible radiation detector, which allows the marking or identification of items to which the film forming polymeric composition has been applied. The polymers of the present invention can be applied to various articles or compositions, including, but not limited to, a container, paper, coating, ink, paint, wallpaper, fiber, film, plastic, wood, concrete, metal ceramic or composite in order to mark or tag the article or composition.

In another embodiment, an article or composition contacted with a polymer of the present invention can be exposed to ultraviolet radiation, near-infrared radiation, or both in order to identify an article or composition. Another advantage of the present invention is that the polymeric compositions produces an essentially "colorless" film when applied to an article. The film, however, is readily detected by conventional blue visible and near-infrared sensitive detector units. Once an article or composition has been contacted with the polymer, the article or composition is invisibly marked. Many of the optical brightener and near-infrared compounds used in this invention absorb little, if any, visible light when used at low levels.

The invention further relates to a method for detecting and separating a fluorescing article or composition and a non-fluorescing article, comprising
  a) exposing the article contacted with the polymer comprising the repeat units of residues of
    i) a monomer comprising a dicarboxylic acid or ester,
    ii) a monomer comprising a diol, diamine or a mixture thereof,
    iii) a monomer comprising at least one sulfonate group and at least one polyester reactive group, and
    iv) a monomer comprising an optical brightener agent having at least one polyester reactive group with ultraviolet radiation,
  b) detecting the emitted blue visible light from the irradiated article via blue visible light detection means, and
  c) separating the fluorescing article or composition from the non-fluorescing article or composition.

The invention further relates to a method for detecting and separating a fluorescing article or composition and a non-fluorescing article, comprising
  a) exposing the article contacted with the polymer comprising the repeat units of residues of
    i) a monomer comprising a dicarboxylic acid or ester,
    ii) a monomer comprising a diol, diamine or a mixture thereof,
    iii) a monomer comprising at least one sulfonate group and at least one polyester reactive group;
    iv) a monomer comprising an optical brightener agent having at least one polyester reactive group; and
    v) a monomer comprising a near-infrared fluorophoric compound with at least one polyester reactive group with ultraviolet radiation, near-infrared radiation, or both;
  b) detecting the emitted blue visible light, near-infrared fluorescent light, or both from the irradiated article via blue visible, or near-infrared fluorescence detection means or both, and
  c) separating the fluorescing article from the non-fluorescing article or composition.

The invention further relates to a method for detecting and separating a fluorescing article and a non-fluorescing article, comprising
  a) exposing the article contacted with the polymer comprising the repeat units of residues of
    i) a monomer comprising a dicarboxylic acid or ester,
    ii) a monomer comprising a diol, diamine or a mixture thereof,
    iii) a monomer comprising at least one sulfonate group and at least one polyester reactive group, and
    iv) a monomer comprising an optical brightener agent having at least one polyester reactive group,
    and a polymer comprising the repeat units of residues of
    v) a monomer comprising a dicarboxylic acid or ester,
    vi) a monomer comprising a diol, diamine or a mixture thereof,
    vii) a monomer comprising at least one sulfonate group and at least one polyester reactive group, and
    viii) a monomer comprising a near-infrared fluorophoric compound with at least one reactive group with ultraviolet radiation, near-infrared radiation or both,
  b) detecting the emitted blue visible, near-infrared light, or both from the irradiated article via blue visible, near-infrared fluorescence detection means or both, and
  c) separating the fluorescing article from the non-fluorescing article.

As described above, an article that has been contacted with the polymers of the present invention and exposed to ultraviolet and/or near-infrared radiation produces blue visible light and/or near-infrared fluorescence radiation. Once the fluorescent light has been detected, it is possible to separate the articles that have been contacted with the polymer with those articles that have not been contacted with the polymer. The separation can be by hand or by an automated machine, for example.

Any light source known in the art that can produce ultraviolet or near-infrared radiation can be used in the present invention. In one embodiment, sunlight or artificial fluorescent light from a light bulb can be a source of ultraviolet light. In one embodiment, the article or composition that is contacted with the polymer can be exposed to ultraviolet radiation at from 220 to 400 nm. In another embodiment, the article or composition is exposed to near-infrared radiation at from 640 to 1100 nm, preferably from 640 to 950 nm. In another embodiment, the article or composition is exposed to ultraviolet and near-infrared radiation. The order in which the article or composition can be exposed to ultraviolet and near-infrared radiation can vary. In one embodiment, the article or composition can be irradiated with ultraviolet radiation followed by near-infrared radiation. In another embodiment, the article or composition can be irradiated with near-infrared radiation followed by ultraviolet radiation. In another embodiment, the article or composition can be irradiated with ultraviolet and near-infrared radiation at the same time.

In another embodiment, the invention relates to a method for enhancing or improving the optical brightness of an article or composition comprising contacting the article or composition with the polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group, and d) a monomer comprising an optical brightener agent having at least one polyester reactive group.

In addition to marking an article with the polymer, the applicants have discovered that the polymers of the present invention can also enhance or improve the optical brightness of an article or composition once the article or composition has been contacted with the polymer. In one embodiment, the composition is an ink, coating, or paint. In another embodiment, the article is a container, paper, film, fiber, or a plastic object.

The invention thus relates to a method for enhancing or improving the optical brightness of an article or composition, comprising contacting the article or composition with a polymer of the present invention. Once the article or composition has been contacted with a polymer containing an optical brightener compound and exposed to ultraviolet light, the optical brightener compound emits blue visible light. The ultraviolet light can emanate from sources such as sunlight or household or fluorescent lighting typically used to light a room. In one embodiment, the optical brightener compound can absorb ultraviolet light at from 200 to 400 nm, preferably from 320 to 380 nm. In another embodiment, the optical brightener compound emits blue visible light at from 400 to 500 nm, preferably at 440 nm. The emitted blue visible light can advantageously cancel out any off-white or yellow discoloration that may be present in the article thus enhancing or improving the optical brightness of the article or composition.

The polymers of the present invention can enhance the optical brightness of an article or composition over a broad time period depending upon the optical brightener, the article or composition that is contacted with the polymer, and the environment in which the article or composition is exposed to. In one embodiment, the polymer can enhance the optical brightness of an article or composition once the article or composition is contacted with the polymer to 50 years, preferably from at least 5 to 10 years.

The amount of optical brightener compound used to prepare the polymers of the present invention can vary. In one embodiment, the optical brightener is present in the polymer at from 10 to 1000 ppm, preferably at from 50 to 500 ppm, and more preferably from 75 to 500 ppm.

The polymer containing the optical brightener compound can be applied to an article or composition using techniques known in the art. In one embodiment, the polymer can be sprayed, coated, or incorporated on the article. The optical brightener when used with a composition, such as for example an ink, coating or paint, can be incorporated on the composition by such methods as for example mixing. The amount of polymer applied to the article or composition can also vary. In one embodiment, the amount of polymer applied to the polymer is enough such that from 10 to 1000 ppm, preferably from 50 to 500 ppm, and more preferably from 75 to 500 ppm of the optical brightener compound is present on the article or composition. Any of the articles or compositions described above can be contacted with the polymers of the present in order to enhance the optical brightness of the article or composition.

The invention further relates to an article or composition contacted with a polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group, and d) a monomer comprising an optical brightener agent having at least one polyester reactive group.

The invention further relates to an article or composition contacted with a polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group;

d) a monomer comprising an optical brightener agent having at least one polyester reactive group; and e) a monomer comprising a near-infrared fluorophoric compound with at least one polyester reactive group.

The invention further relates to an article or composition contacted with a first polymer comprising the repeat units of residues of a) a monomer comprising a dicarboxylic acid or ester, b) a monomer comprising a diol, diamine or a mixture thereof, c) a monomer comprising at least one sulfonate group and at least one polyester reactive group, and d) a monomer comprising an optical brightener agent having at least one polyester reactive group, and a second polymer comprising the repeat units of residues of i) a monomer comprising a dicarboxylic acid or ester, ii) a monomer comprising a diol, diamine or a mixture thereof, iii) a monomer comprising at least one sulfonate group and at least one polyester reactive group, and iv) a monomer comprising a near-infrared fluorophoric compound with at least one polyester reactive group.

Any article or composition that requires the need to authenticate the origin of the article or composition can be contacted with the polymers of the present invention. In another embodiment, any article or composition that needs to have its optical brightness improved can be contacted with the polymers of the present invention. As described above, a number of articles or compositions can be contacted with the polymers of the present invention. In one embodiment, the article or composition is a container, paper, coating, ink, paint, wallpaper, wallboard, fiber, film, any plastic object such as plastic wood, wood, concrete, metal, ceramic or thermnoplastic composite. In another embodiment, the polymers of the present invention can be applied to thermoplastic or thermnosetting polymers such as polyesters, polyolefins, polyamides, polyimides, polyvinyl chloride, polyvinylidene chloride, polyurethanes, polycarbonates, cellulose esters, polyacrylates, polyvinylesters, polyester-amides, polystyrene, acrylonitrile-butadiene-styrene, and styrene-acrylonitrile, followed by drying to leave a residue of solids in the form of a coating.

EXAMPLES

The following examples are put forth so as to provide those of ordinary skill in the art with a complete disclosure and description of how the compositions of matter and methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature and pressure is at or near atmospheric.

Example 1
Preparation of 2,5-bis(4'-carbomethoxystyryl)-1,3,4-oxadiazole (XI)

To a solution of hydrazine monohydrate (0.025 mole) and sodium bicarbonate (0.05 mole) in 100 mL of water, 4-carbomethoxycinnamoyl chloride (0.05 mole) in 100 mL of tetrahydrofuran was added slowly with stirring. After stirring for an additional 30 min., the intermediate X was filtered off and washed with 1 liter of water. A solution of X (0.026 mole) in 40 InL of phosphorus oxychloride and 10 mL of toluene was refluxed for 6 hours. The product XI was obtained by filtration and washing with water (yield 90%). UV/VIS (CH$_2$Cl$_2$/TFA) $\lambda_{max}$ 343 nm; Fluorescence emission (CH$_2$Cl$_2$/TFA) ) $\lambda_{max}^{em}$ 419 nm.

peroxide (2.5 g) in 900 mL of carbontetrachloride was heated to reflux at 76° C. for 8 hours. After cooling to room temperature, the product XII was filtered, washed with hot water and acetone. Yield: 90%. Compound XII (0.2 mole) was added slowly to hot triethyl phosphite (2.0 mole, 340 mL) at 135° C. with stirring over 30 minutes. The pot temperature was then raised to 170° C. and the mixture was refluxed (150° C.) for 5 hours with removal of low boilers. After cooling to room temperature, the product XIII was filtered and washed with heptane. Yield: 83%. Methyl 4-formylbenzoate (0.22 mole) in 300 mL of dimethyl formamide at 40° C. and sodium methoxide (0.34 mole) was added slowly to a solution of XIII (0.1 mole), at 40–50° C. over 20 minutes. After the mixture was heated at 40° C. for 4 hours, 300 mL of water was added at room temperature. The final product XIV was filtered and washed with water to a pH 6–7. For purification, XIV was recrystallized from 1,-2-dichlorobenzene. Yield: 18%.

Procedure B: Potassium t-butoxide (0.05 mole) was added to a solution of 2,5-ditolyl-1,3,4-oxadiazole (0.01 mole) in 80 mL of glyme at 35° C. and the mixture was stirred for 2 hours. Methyl 4-formylbenzoate (0.022 mole) was added, and the mixture was heated at 35° C. for 4 hours. At room temperature, 80 mL of water was added and the mixture was

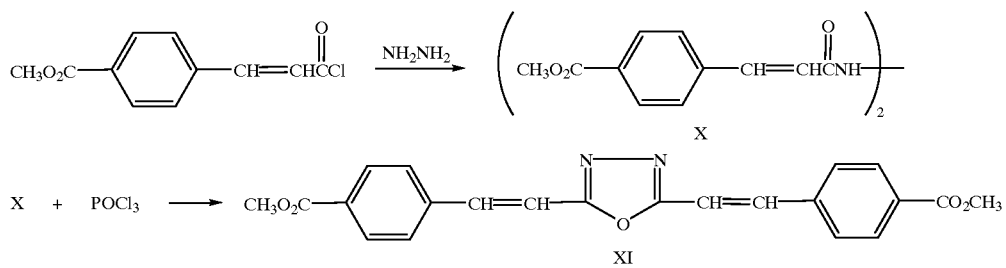

Example 2
Preparation of 2,5-bis(4'-carbomethoxystilbenyl)-1,3,4-oxadiazole (XIV)

Procedure A: A solution of 2,5-ditolyl-1,3,4-oxadiazole (0.25 mole), N-bromosuccinimide (0.525 mole), benzoyl stirred for one hour. The product XIV was then filtered, and washed with water to pH 6–7. For purification, XIV was heated in DMF to reflux, and then obtained by filtration after being cooled to room temperature (yield 12%). UV/VIS (CH$_2$Cl$_2$/TFA) $\lambda_{max}$ 365 nm; Fluorescence emission (CH$_2$Cl$_2$/TFA) $\lambda_{max}^{em}$ 422 nm.

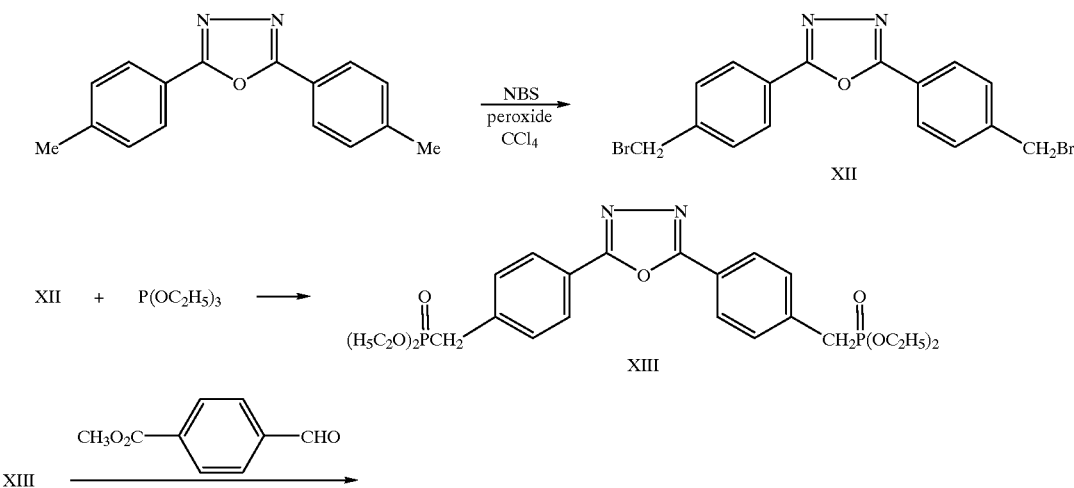

-continued

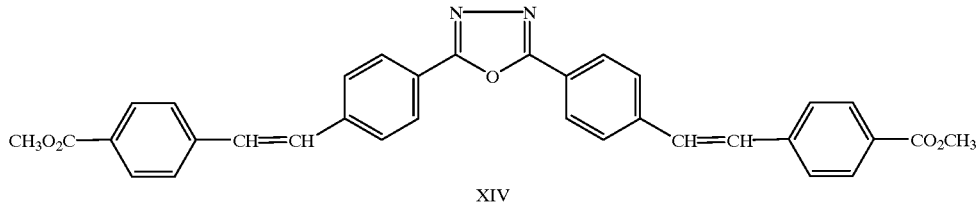

XIV

Example 3
Preparation of a Water Dispersible Polyester XV

A mixture of dimethyl isophthalate (0.42 mole), dimethyl 5-sodiosulfoisophthalate (0.08 mole), diethylene glycol (0.42 mole), cyclohexanedimethanol (0.24 mole), sodium acetate (0.008 mole), Ti catalyst (titanium tetrabutoxide 75 ppm in n-butanol) and the optical brightener compound XI (0.14 g, 0.0004 mole) was heated at 200° C. for one hour, then at 220° C. for 2 hours, and then at 250° C. under reduced pressure for one hour with removal of low boilers. The polymer product XV has an inherent viscosity (IV) of 0.36, a weight average molecular weight (Mw) of 10,653, a number average molecular weight (Mn) of 1,569, a polydispersity (Mw/Mn or Mz) of 21,702, a glass transition temperature (Tg) of 48° C. and contains about 1,000 ppm of the optical brightener (XI) copolymerized. UV/VIS (Millipore water) $\lambda_{max}$ 348 nm (vs 343 nm for XI). Fluorescence emission (Millipore water) $\lambda_{max}^{em}$ 427 nm (vs $\lambda_{max}^{em}$ 419 nm for XI).

Example 4
Preparation of a Water Dispersible Polyester XVI

The same procedure as described in Example 3 was used to prepare the water dispersible polyester containing XIV (1,000 ppm). The polymer product XVI has an inherent viscosity (IV) of 0.363, a weight average molecular weight (Mw) of 20,976, a number average molecular weight (Mn) of 9,595, a polydispersity (Mw/Mn or Mz) of 31,529, a glass transition temperature (Tg) of 53° C. and contains about 1,000 ppm of the optical brightener (XIV) copolymerized. UV/VIS (Millipore water) $\lambda_{max}$ 373 nm (vs 365 nm for XIV in $CH_2Cl_2$/TFA). Fluorescence emission (Millipore water) $\lambda_{max}^{em}$ 407, 429 nm (vs $\lambda_{max}^{em}$ 399, 422 nm for XIV when excited at 365 nm).

Example 5
Preparation of Water-Dispersible Polyester Containing XIV and a Near-infrared Fluorescent Dye The same procedure as described in Example 3 was used to prepare a water-dispersible polyester with XIV (1,000 ppm) except that a near-infrared fluorescent monomer (silicon(IV)2,3-naphthalocyanine dihydroxide 1,000 ppm), which is referred to as 780 NIRF, was added together with the optical brightener compound XIV. The polymer product XVII has an inherent viscosity (IV) of 0.329, a weight average molecular weight (Mw) of 16,613, a number average molecular weight (Mn) of 4,367, a polydispersity (Mw/Mn or Mz) of 24,709, and a glass transition temperature (Tg) of 53° C. UV/VIS (Millipore water) $\lambda_{max}$ 367 nm (vs 365 nm for XIV in $CH_2Cl_2$/TFA). Fluorescence emission (Millipore water) $\lambda_{max}^{em}$ 405, 429 nm (vs $\lambda_{max}^{em}$ 386, 412 nm for XIV when excited at 367 nm).

Example 6
Preparation of Water Dispersion of Polyester XV

The water-dispersible polyester pellets XV produced in Example 3 (30 g) were added slowly to hot water (100 g) at about 70–90° C. under constant agitation. A clear water dispersion of the polyester with particle size in the range of from 20 to 30 nm was obtained by stirring at about 70°–90° C. for 30–60 minutes.

Example 7
Evaluation of the Water Dispersion of Polyester XV

A. The water dispersions of XV from Example 6 were used to form a film on paper with number 3 and 6 Meyer rods. The films were formed side-by-side using the water dispersion with and without compound XI. These films were dried at room temperature, and analyzed by FMC-II method for b-values (yellowness to blueness) using ACS Applied Color System. The b-value for the film composed of polyester XV was −1.15 (bluer) compared to the polyester film that was not prepared with the optical brightener compound XI.

B. The following examples were done in the same manner as procedure A, and the data are shown in Table 1. The films were applied to paper and metal panel. The b-values in Table 1 are comparisons between films prepared from polyester XV, which was prepared from the optical brightener compound XI, and a polyester film that does not contain XI. The b-values in Table 1 are relative to the polyester alone and the polyester containing compound XI, and reveal that the polyester films prepared with the optical brightener compound XI are bluer than the polyester films that were not prepared from XI.

TABLE 1

| additive | article | b-value |
|---|---|---|
| 1.5% by weight $TiO_2$ | paper | −1.25 |
| no $TiO_2$ | metal panel | −1.66 |
| 1.5% by weight $TiO_2$ | metal panel | −5.71 |

Example 8
Preparation of a Water Dispersion of XVII

The polyester pellets XVII produced in Example 6 (100 g) were added slowly to 250 mL of hot water at 95° C. with stirring until a dispersion was formed. After standing at room temperature for 24 hours, the dispersion was filtered. Total weight of the final dispersion which contained 30% by weight XVII having 1,000 ppm each of the optical brightener agent XIV and the infrared fluorescent agent, 780 NIRF, was 333 grams.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer comprising the repeat units of residues of
   a) a monomer comprising a dicarboxylic acid or ester,
   b) a monomer comprising a diol, diamine or a mixture thereof,
   c) a monomer comprising at least one sulfonate group and at least one polyester reactive group, and
   d) a monomer comprising an optical brightener agent having at least one polyester reactive group.

2. The polymer of claim 1, wherein the polymer is water dispersible.

3. The polymer of claim 1, wherein at least 20% of the groups linking the monomeric units are ester linkages.

4. The polymer of claim 1, wherein the dicarboxylic acid comprises an aliphatic diacid, a cycloaliphatic diacid, an aromatic diacid or a mixture thereof.

5. The polymer of claim 1, wherein the dicarboxylic acid comprises succinic acid, glutaric acid, adipic acid, azelaic acid, sebacic acid, 1,4-cyclohexanedicarboxylic acid, phthalic acid, terephthalic acid, isophthalic acid, 2,6-naphthalenedicarboxylic acid, or a mixture thereof.

6. The polymer of claim 1, wherein the dicaiboxylic acid comprises 1,4-cyclohexanedicarboxylic acid or isophthalic acid.

7. The polymer of claim 1, wherein the dicarboxylic ester comprises dimethyl ester of 1,4-cyclohexanedicarboxylic acid, dimethyl ester of isophthalic acid, or a mixture thereof.

8. The polymer of claim 1, wherein the amount of dicarboxylic acid or ester is from 35 to 65 parts by weight of the total polymer, wherein the sum of components a–d is equal to 100 parts.

9. The polymer of claim 1, wherein the diol comprises an aliphatic glycol, an aralkyl glycol, a cycloaliphatic glycol or a mixture thereof.

10. The polymer of claim 1, wherein the diol comprises ethylene glycol; diethylene glycol; propylene glycol; 1,3-propanediol; 2,4-dimethyl-2-ethylhexane-1,3-diol; 2,2-dimethyl-1,3-propanediol; 1,3-butanediol; 1,4-butanediol; 1,5-pentanediol; 1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; 2-methyl-1,3-propanediol, or a mixture thereof.

11. The polymer of claim 1, wherein the diol comprises ethylene glycol, 1,4-cyclohexanedimethanol, diethylene glycol or a mixture thereof.

12. The polymer of claim 1, wherein the diamine comprises an aliphatic diamine, a cycloaliphatic diamine, an aralkyl diamine or a mixture thereof.

13. The polymer of claim 1, wherein the diamine comprises 1,6-hexamethylenediamine; 1,6-cyclohexanedimethylamine; 1,3-diaminomethylbenzene; 2,2-dimethyl-1,3-propanediamine; $H_2NCH_2CH_2(OCH_2CH_2)_yOCH_2CH_2NH_2$, wherein v is an integer of from 0 to 20, or a mixture thereof.

14. The polymer of claim 1, wherein the amount of diamine is from 0 to 50 parts by weight of the total polymer, wherein the sum of components a–d is equal to 100 parts.

15. The polymer of claim 1, wherein the sulfonate group is attached to an aromatic group.

16. The polymer of claim 15, wherein the aromatic group comprises benzene, naphthalene, diphenyl, oxydiphenyl, sulfonyldiphenyl or methylenediphenyl.

17. The polymer of claim 1, wherein the sulfonate comprises a metal ion and the metal ion comprises an alkali metal, alkaline earth metal, a transition metal, a lanthanide or an actinide.

18. The polymer of claim 17, wherein the metal ion comprises sodium, lithium or potassium.

19. The polymer of claim 1, wherein component (c) comprises sulfophthalic acid, sulfoterephthalic acid, sulfoisophthalic acid, 4-sulfonaphthalene-2,7-dicarboxylic acid, 5-sulfoisophthalic acid or the salt or ester thereof.

20. The polymer of claim 1, wherein component (c) is 5-sodiosulfoisophthalic acid.

21. The polymer of claim 1, wherein the amount of component (c) is from 5 to 65 parts by weight of the total polymer, wherein the sum of components a–d is equal to 100 parts.

22. The polymer of claim 1, wherein the amount of component (c) is from 8 to 30 parts by weight of the total polymer, wherein the sum of components a–d is equal to 100 parts.

23. The polymer of claim 1, wherein the optical brightener agent has the structure

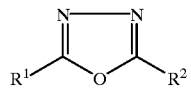

wherein $R^1$ and $R^2$ are, independently, naphthyl, diphenyl, aryl, alkenyl, alkynyl or heteroaryl wherein said moieties $R^1$ and $R^2$ are substituted or unsubstituted.

24. The polymer of claim 23, wherein $R^1$ and $R^2$ are independently both aryl groups and the aryl group has the structure

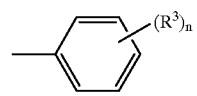

wherein,
each $R^3$ independently comprises an alkyl group, a cycloalkyl group, an aralkyl group, an alkenyl group, an alkyyl group, an alkoxy group, an alkenyloxy group, an alkynyloxy group, a substituted or unsubstituted amino group, a halogen, or a carboxyl group, wherein the carboxyl group comprises a carboxylic acid, an ester, an anhydride, a carbonyl halide, or a carbamide, and
n is an integer of from 1 to 5.

25. The polymer of claim 24, wherein $R^3$ has the structure

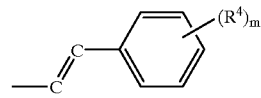

wherein each $R^4$ independently comprises a polyester reactive group and m is an integer of from 1 to 3.

26. The polymer of claim 25, wherein $R^4$ comprises a carboxyl group, wherein the carboxyl group comprises a carboxylic acid, an ester, an anhydride, a carbonyl halide, or a carbamide.

27. The polymer of claim 23, wherein $R^1$ and $R^2$ have the structure

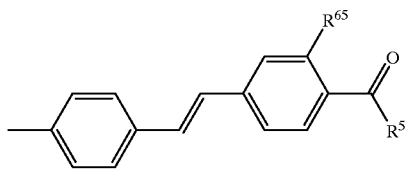

wherein R⁵ comprises a hydroxyl group, an alkoxy group, an alkoxy hydroxy group, an alkenyloxy group, an alkynyloxy group, an amide, a halide, a carboxyl group or a substituted or unsubstituted amino group, and R⁶⁵ comprises hydrogen, a halide, an alkyl group, or an alkoxy group.

28. The polymer of claim 27, wherein R⁵ is hydroxy, methoxy, ethoxy, butoxy, 2-ethyl-hexyloxy, NHCH₂CH₂NH₂, OCH₂CH₂OH, fluoro, chloro, bromo, or iodo and R⁶⁵ is hydrogen.

29. The polymer of claim 27, wherein R⁵ is methoxy and R⁶⁵ is chloride, fluoride, methyl or methoxy.

30. The polymer of claim 23, wherein both R¹ and R² are independently an alkenyl group and each alkenyl group independently has the structure

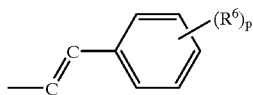

wherein R⁶ is a polyester reactive group, and
p is an integer of from 1 to 3.

31. The polymer of claim 30, wherein R⁶ comprises a carboxyl group, wherein the carboxyl group comprises a carboxylic acid, an ester, an anhydride, a carbonyl halide, or a carbarnide.

32. The polymer of claim 23, wherein each of R¹ and R² independently have the structure

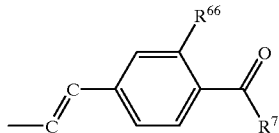

wherein R⁷ comprises a hydroxyl group, an alkoxy group, an alkoxy hydroxy group, an alkenyloxy group, an alkynyloxy group, an arnide, a halide, a carboxyl group or a substituted or unsubstituted amino group, and R⁶⁶ comprises hydrogen, a halide, an alkyl group, or an alkoxy group.

33. The polymer of claim 32, wherein R⁷ is hydroxy, methoxy, ethoxy, butoxy, 2-ethyl-hexyloxy, NHCH₂CH₂NH₂, OCH₂CH₂OH, fluoro, chloro, bromo, or iodo and R⁶⁶ is hydrogen.

34. The polymer of claim 32, wherein R⁷ is methoxy and R⁶⁶ is chloride, fluoride, methyl or methoxy.

35. The polymer of claim 1, wherein the optical brightener agent has the structure

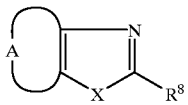

wherein

A is the residue of a fused aryl;

R⁸ is naphthyl, diphenyl, aryl, alkenyl, alkynyl or heteroaryl, wherein said moiety R⁸ is substituted or unsubstituted, and X is —O—, —S—, or —N(R⁹), wherein R⁹ is hydrogen, alkenyl or an unsubstituted or substituted alkyl, cycloalkyl or aryl, wherein at least one polyester reactive group is present in the optical brightener agent.

36. The polymer of claim 35, wherein RS has the structure

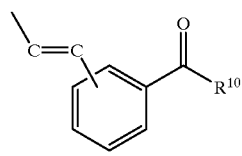

wherein R¹⁰ is halogen or W—R²⁷, wherein W is —O— or —N(R²⁸), wherein R²⁷ and R²⁸ are independently hydrogen, alkenyl or an unsubstituted or substituted alkyl, cycloalkyl or aryl.

37. The polymer of claim 36, wherein the optical brightener agent has the structure

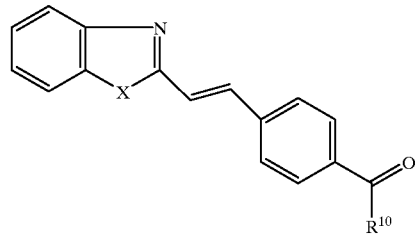

wherein

X is —O—, —S—, or —NH—, and

R¹⁰ is hydroxy, alkoxy, hydroxylalkylamine or di(hydroxyalkyl)amine.

38. The polymner of claim 36, wherein the optical brightener agent has the structure

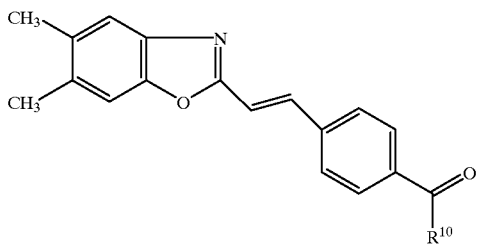

wherein R¹⁰ is lower alkoxy, hydroxy or chloro.

39. The polymer of claim 36, wherein the optical brightener agent has the structure

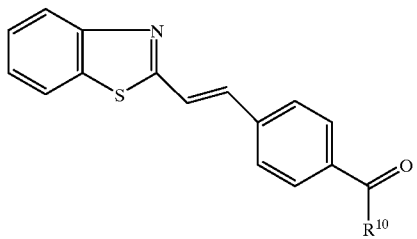

wherein $R^{10}$ is lower alkoxy, hydroxy or chloro.

40. The polymer of claim 36, wherein the optical brightener agent has the structure

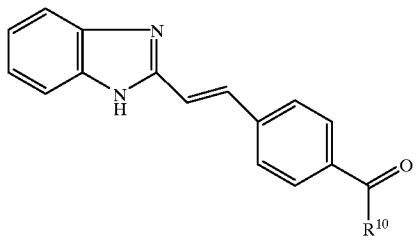

wherein $R^{10}$ is lower alkoxy, hydroxy or chloro.

41. The polymer of claim 1, wherein the optical brightener agent has the structure

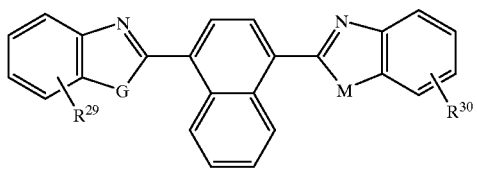

wherein $R^{29}$ is a polyester reactive group;

$R^{30}$ is naphthyl, diphenyl, aryl, alkenyl, alkynyl, heteroaryl or a polyester reactive group, wherein said moiety $R^{30}$ is substituted or unsubstituted; and G and M are independently —O—, —S—, or $NR^{31}$, wherein $R^{31}$ is branched or straight chain $C_1$–$C_{12}$.

42. The polymer of claim 1, wherein the optical brightener agent has the structure

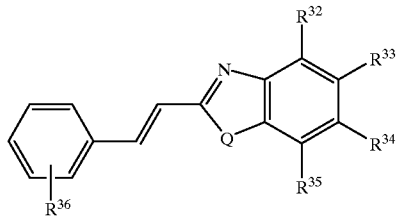

wherein $R^{32}$, $R^{33}$, $R^{34}$ and $R^{35}$ are independently hydrogen, substituted or unsubstituted lower alkyl, cycloalkyl, aryl, lower alkylaryl, alkoxy or a fused ring;

$R^{36}$ is a polyester reactive group; and

Q is —O—, —S—, or —$NR^{37}$, wherein $R^{37}$ is branched or straight chain $C_1$–$C_{12}$.

43. The polymer of claim 1, wherein the optical brightener agent has the structure

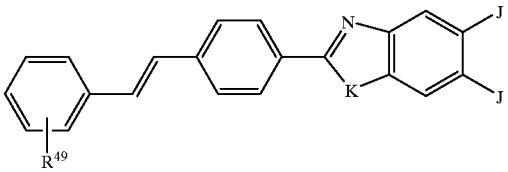

wherein

K is —S—, —O—, or $NR^{50}$, wherein $R^{50}$ is $C_1$–$C_4$ branched or straight chain alkyl;

$R^{49}$ is a polyester reactive group, and each J is independently hydrogen, a cyano group, a nitro group, or a trifluoromethyl group.

44. The polymer of claim 1, wherein the optical brightener agent has the structure

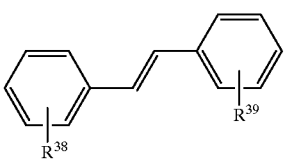

wherein $R^{38}$ is a polyester reactive group, and $R^{39}$ is naphthyl, diphenyl, aryl, alkenyl, alkyyl, cycloalkylene, heteroaryl or a polyester reactive group wherein said moiety $R^{39}$ is substituted or unsubstituted.

45. The polymer of claim 1, wherein the optical brightener agent is a benzopyran having the structure

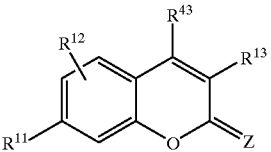

wherein $R^{11}$ is hydroxy, —$OR^{14}$ or —$OC(O)R^{15}$;

$R^{12}$ is hydrogen, alkyl, —$OR^{40}$ or halogen;

$R^{13}$ is cyano, —$C(O)R^{41}$, —$CO_2R^{41}$, carbamoyl, —$C(O)N(R^{42})(R^{42})$, —$SO_2R^{42}$ or a carbocyclic or heterocyclic aryl group;

$R^{43}$ is hydrogen, aryl, alkyl or —$CH_2CO_2R^{44}$;

$R^{14}$, $R^{40}$ and $R^{42}$ are independently alkenyl, alkyl, cycloalkyl or aryl;

$R^{15}$, $R^{41}$ and $R^{44}$ are independently hydrogen, alkyl, cycloalllyl or aryl;

$R^{44}$ is alkyl, cycloalkyl or aryl radical; and

Z is oxo or imino, wherein the benzopyran has at least one polyester reactive group.

46. The polymer of claim 1, wherein the optical brightener agent has the structure

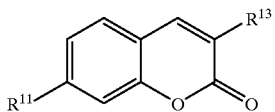

wherein
R$^{11}$ is hydroxy, hydroxyalkoxy, alkanoyloxyalkoxy, alkoxycarbonylalkoxy or alkoxycarbonylphenylalkoxy, and
R$^{13}$ is alkoxycarbonyl, arylsulfonyl, cyano, 2-benzoxazolyl, 2-benzothiazolyl or 2-benzimidazolyl,
wherein each alkoxy group of R$^{11}$ and R$^{13}$ independently contains from one to six carbon atoms and each aryl group independently is a phenyl group or phenyl substituted with a C$_1$–C$_4$ alkyl group or halogen.

47. The polymer of claim 1, wherein the optical brightener agent has the structure

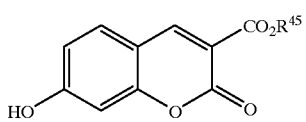

wherein R$^{45}$ is alkyl of from one to six carbon atoms.

48. The polymer of claim 1, wherein the optical brightener agent has the structure

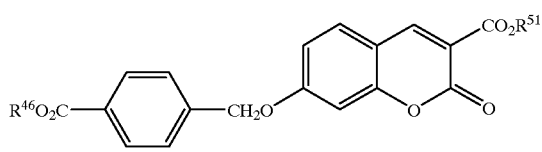

wherein R$^{51}$ and R$^{46}$ are independently alkyl of from one to six carbon atoms.

49. The polymer of claim 1, wherein the optical brightener agent has the structure

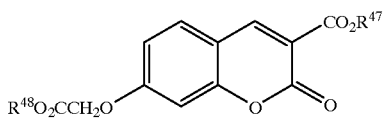

wherein R$^{47}$ and R$^{48}$ are independently an alkyl group of from one to six carbon atoms.

50. The polymer of claim 1, wherein the optical brightener agent has the structure

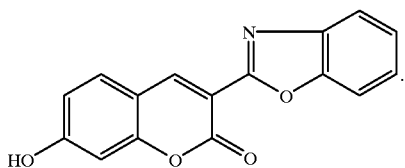

51. The polymer of claim 1, wherein the amount of the optical brightener agent is from 0.00001 to 30 parts by weight of the total polymer.

52. The polymer of claim 1, further comprising a residue of a monomer of a near-infrared fluorophoric compound with at least one polyester reactive group.

53. The polymer of claim 52, wherein the near-infrared fluorophoric compound comprises a phthalocyanine, a naphthalocyanine, a squaraine, or a mixture thereof.

54. The polymer of claim 52, wherein the near-infrared fluorophoric compound has two polyester reactive groups.

55. The polymer of claim 52, wherein the near-infrared flourophoric compound comprises a phthalocyanine, a 2,3-naphthalocyanine or a squaraine.

56. The polymer of claim 52, wherein the near-infrared fluorophoric compound is a compound having the structure I, II or III:

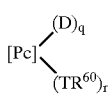

I

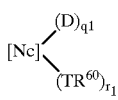

II

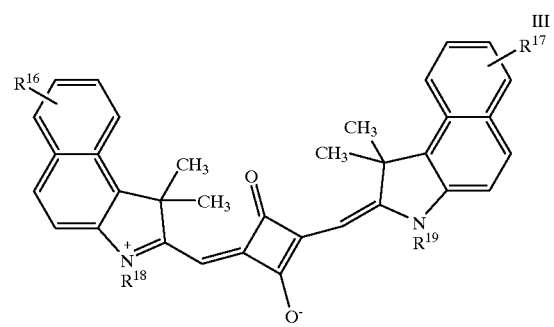

III wherein Pc represents a phthalocyanine moiety having the structure IV and Nc represents a 2,3-naphthalocyanine moiety having the structure V,

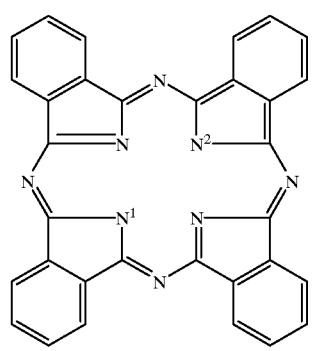

IV

V

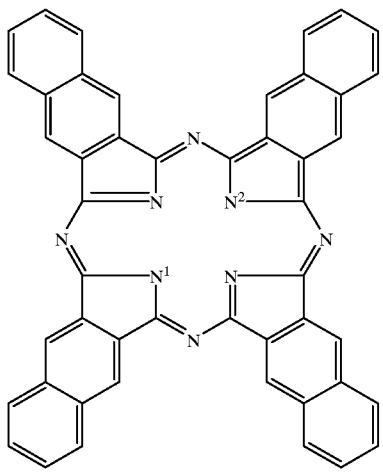

wherein N¹ and N² can independently be bonded to hydrogen or to various metals comprising halometals, organometallic groups, and oxymetals comprising AlCl, AlBr, AlF, AlOH, AlOR²⁰, AlSR²⁰, Ca, Ge, Ga, InCl, Mg, SiCl₂, SiF₂, SnCl₂, Sn(OR²¹)₂, Si(OR²¹)₂, Sn(SR²¹)₂, Si(SR²¹)₂, Sn, or Zn, wherein $R^{20}$ and $R^{21}$ are selected from hydrogen, alkyl, aryl, lower alkanoyl, trifluoroacetyl or groups of the formula

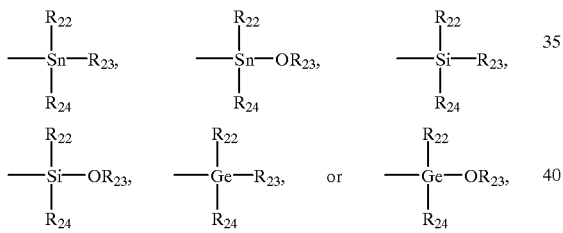

$R^{22}$, $R^{23}$ and $R^{24}$ are independently selected from alkyl, phenyl or phenyl substituted with lower alkyl, lower alkoxy or halogen;

T is selected from oxygen, sulfur, selenium, tellurium or a group of the formula —NR²⁵, wherein R²⁵ is hydrogen, cycloalkyl, alkyl, acyl, alkylsulfonyl, or aryl or $R^{25}$ and $R^{60}$ taken together form an aliphatic or aromatic ring with the nitrogen atom to which they are attached;

D is selected from alkyl, aryl, halogen or hydrogen;

$R^{60}$ is selected from unsubstituted or substituted alkyl, alkenyl, alkynyl, $C_3$–$C_8$ cycloalkyl, aryl, heteroaryl,

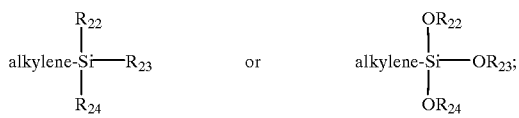

—(TR⁶⁰)ᵣ is alkylsulfonylamino, arylsulfonylamino, or a group selected from the formula —C(C₂H₄O)ₑR²⁶,

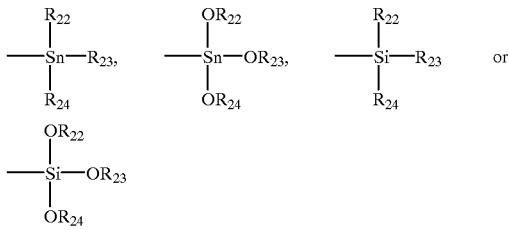

wherein $R^{26}$ is hydrogen or R as defined above; e is an integer of from 1–4; or two —(TR⁶⁰)ᵣ groups can be taken together to form divalent substituents of the formula

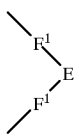

wherein each $F^1$ is independently —O—, —S—, or —N—R²⁵ and E comprises an alkyl group comprising ethylene, propylene or trimethylene, wherein the alkyl group is substituted with $C_1$–$C_4$ alkyl, $C_1$–$C_4$ alkoxy, aryl, cycloalkyl; 1,2-phenylene and 1,2-phenylene containing from 1 to 3 substituents selected from $C_1$–$C_4$ alkyl, $C_1$–$C_4$ alkoxy or halogen;

$R^{16}$ and $R^{17}$ are independently selected from hydrogen, lower alkyl, lower alkoxy, halogen, aryloxy, lower alkylthio, arylthio, lower alkylsulfonyl; arylsulfonyl; lower alkylsulfonylamino, arylsulfonylamino, cycloalkylsulfonylamino, carboxy, unsubstituted and substituted carbamoyl and sulfarnoyl, lower alkoxycarbonyl, hydroxy, lower alkanoyloxy,

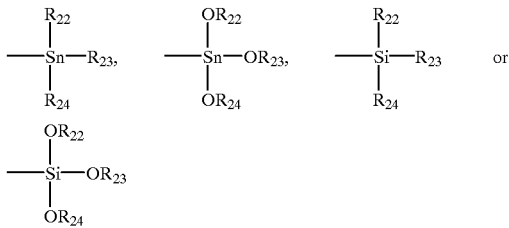

$R^{18}$ and $R^{19}$ are independently hydrogen, lower alkyl, alkenyl or aryl;

q is an integer from 0 to 12 and r is an integer from 4 to 16 provided that the sum of q and r is 16 and at least one polyester reactive group is present, and $q_1$ is an integer from 0 to 24 and $r_1$ is an integer from 0 to 16, provided that the sum of $q_1$ and $r_1$ is 24 and at least one polyester reactive group is present.

57. The polymer of claim 56, wherein the near-infrared fluorophoric compound is a squaraine compound having the structure III, wherein $R^{16}$ and $R^{17}$ are independently carboxy or lower alkoxycarbonyl.

58. The polymer of claim 56, wherein the near-infrared fluorophoric compound is a 2,3-naphthalocyanine compound having the structure II, wherein D is hydrogen, $q_1$ is 24, and $r_1$ is 0.

59. The polymer of claim 56, wherein the near-infrared fluorophoric compound is a 2,3-naphthalocyanine compound of Formula II, wherein the naphthalocyanine moiety is bonded to $SiCl_2$, $Si(OH)_2$, or $Si(OR^{21})_2$.

60. The polymer of claim 56, wherein the near-infrared fluorophoric compound is a phthalocyanine compound having the structure I, wherein T is oxygen, $R^{60}$ is aryl, D is hydrogen, r is 4, and q is 12; and wherein the phthalocyanine moiety is bonded to AlCl, AlOH, $AlOCOCF_3$, $AlOR^{20}$, $SiCl_2$, $Si(OH)_2$, $Si(OR^{21})_2$, GaCl, GaOH, $GaOC(O)CF_3$, $GaOR^{20}$, InCl, InOH, $InOC(O)CF_3$, $InOR^{20}$, magnesium, zinc, or hydrogen.

61. The polymer of claim 52, wherein the near-infrared fluorophoric compound is from 0.00001 to 10 parts by weight of the total polymer.

62. The polymer of claim 1, wherein the polymer has an intrinsic viscosity of from 0.15 to 0.45 dL/g as determined by the ASTM method D2857.70.

63. The polymer of claim 1, wherein the polymer has an intrinsic viscosity of from 0.25 to 0.35 dL/g as determined by the ASTM method D2857.70.

* * * * *

UNITED STATES PATENT AND TRADEMARK OFFICE
CERTIFICATE OF CORRECTION

PATENT NO. : 6,150,494
DATED : November 21, 2000
INVENTOR(S) : Wang et al.

It is certified that error appears in the above-identified patent and that said Letters Patent is hereby corrected as shown below:

Claim 6,
Line 1, delete "dicaiboxylic" and insert thereof -- dicarboxylic --.

Claim 13,
Line 5, delete "$H_2NCH_2CH_2(OCH_2CH_2)_yOCH_2CH_2NH_2$" and insert thereof
-- $H_2NCH_2CH_2(OCH_2CH_2)_vOCH_2CH_2NH_2$ --.

Claim 24,
Line 8, delete "alkyyl" and insert thereof -- alkynyl --.

Claim 26,
Line 3, delete "ester1" and insert thereof -- ester, --.

Claim 32,
Line 6, delete "arnide" and insert thereof -- amide --.

Claim 36,
Line 1, delete "RS" and insert thereof -- $R^8$ --.

Claim 44,
Line 6, delete "alkyyl" and insert thereof -- alkynyl --.

Claim 45,
Line 8, delete "cycloalllyl" and insert thereof -- cycloalkyl --.

Claim 56,
Line 26, delete "$sulfur_1$" and insert thereof -- sulfur, --.

Signed and Sealed this

Twenty-fifth Day of September, 2001

Attest:

NICHOLAS P. GODICI
Attesting Officer    Acting Director of the United States Patent and Trademark Office